United States Patent Office 3,119,209
Patented Jan. 28, 1964

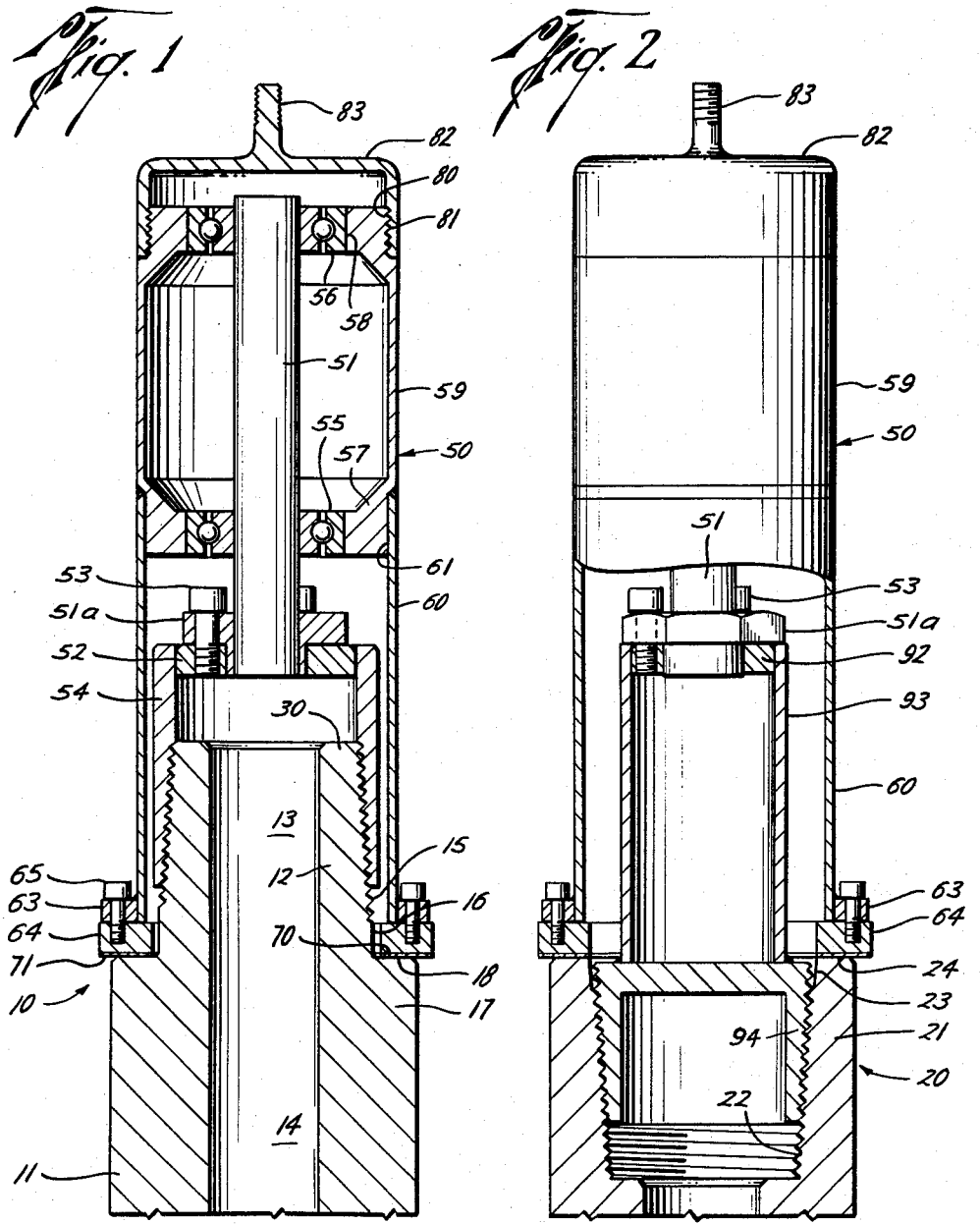

3,119,209
SHOULDER FACING TOOL
Stanley C. Moore and Samuel T. Crews, Jr., Midland, Tex., assignors to Drilco Oil Tool, Inc., Midland, Tex., a corporation of Texas
Filed Jan. 7, 1963, Ser. No. 249,684
1 Claim. (Cl. 51—241)

This invention pertains to a facing tool for resurfacing the seal shoulder of tool joints such as are used to connect the lengths of drill pipe used in the rotary drilling of oil wells.

Objects of the invention are to provide such a tool that will resurface the shoulder in a plane that is to a high degree of accuracy perpendicular to the axis of the tool joint thread, to provide such a tool that will be readily portable and that can be driven by an ordinary electric drill motor, and to provide such a tool that is adaptable for facing both pin and box tool joint shoulders.

According to the invention a support shaft carries a connector at one end which is screwed to the tapered tool joint thread so as to draw the shaft into axial alignment with the tool joint thread to a high degree of accuracy. A drive tube is axially slidably supported on the support shaft, which is of considerable length, by axially spaced apart bearings, to provide alignment with the support shaft axis (and hence with the tool joint thread axis) to a high degree of accuracy. An annular face plate carried by the drive tube, at the end thereof adjacent the support shaft connector, carries an annular sheet of abrasive material, secured thereto by pressure sensitive adhesive. The use of abrasive as the cutting element makes it unnecessary to have a mechanical axial feed to avoid chattering, as would be the case with a bladed cutting element. At the other end of the drive tube there is connected a threaded drive shaft for connection with the drive shaft of an electric drill motor. In order that the same drive tube and support shaft may be used for facing both pin and box shoulders, alternative plug and ring connectors are provided for connecting the support shaft to the tool joint, the plug connector having a tubular extension to make up for the difference in length between the drive tube and support shaft. The drive tube and extension tube being of tubular material, e.g. steel, reduces the weight of the device.

For a detailed description of a preferred embodiment of the invention, reference will now be made to the accompanying drawings wherein:

FIGURE 1 is an axial section showing a facing tool according to the invention in conjunction with a tool joint pin; and FIGURE 2 is an axial section showing a tool joint box with the same tool modified for use therewith.

Referring first to FIGURE 1, there is shown a male tool joint 10. This may be a separate piece screwed on to the end of a drill pipe or drill collar or may be flash welded to a drill pipe or be formed integrally on the end of a drill collar 11 as shown. The tool joint includes a pin 12 having a generally cylindrical bore 13 concentric with bore 14 of the drill collar and an external conically tapered, coarse threaded portion 15, the latter merging with an unthreaded strain portion 16. The axis of the thread on the pin is concentric with bore 13. Adjacent to the strain portion 16 is a shoulder 17 having a face 18, perpendicular to the axis of the thread on pin 12. Face 18 is smooth to provide a seal surface.

Referring now to FIGURE 2 there is shown a portion of a female tool joint 20, including a box 21 having an internal conically tapered, coarse threaded portion 22 concentric with the body of the drill collar (not shown) or other pipe member connected therewith, and an unthreaded strain portion 23. The end face 24 of strain portion 23 is smooth to provide a smooth sealing surface. Box 21 is correlative to pin 12 so that threaded portion 22 will connect with threaded portion 15 and when they are fully engaged face 18 on the pin shoulder will bear against face 24 at the mouth of the box and seal therewith, while strain portions 16 and 23 will respectively be in compression and tension to maintain the connection between the tool joints and keep it from accidentally coming apart and to maintain the seal between the faces 18 and 24 despite dimensional changes of the tool joints caused by temperature changes or by load stresses.

In addition to or instead of providing an exterior seal at the mouth of the tool joint box adjacent a shoulder around the tool joint pin, there may be provided an internal seal between the end 30 of the tool joint pin and the bottom (not shown) of the tool joint box, or between step shoulders either inside or outside the threaded parts of the joints, or even in the middle of the threaded portion. Also, the sealing faces may be at angles other than perpendicular to the axis of the tool joints. Wherever placed and at whatever angle it is necessary for the seal faces to be smoothed periodically whenever they have become worn or damaged, and the present tool is intended to accomplish that result.

As shown in FIGURE 1, the tool 50 comprises a support shaft 51 showing a flange 51a shrink fitted thereon at one end. A disc 52 is secured to the flange by screws 53. An internally threaded ring 54 is welded to disc 52. Ring 54 has threads therein similar to those of tool joint box 21, with the axis of its threads concentric with support shaft 51, so that when the ring 54 is screwed on to pin 12, the axis of support shaft 51 will be concentric with that of pin 12. Due to the taper, the threaded portion of the ring can be made up very tight on pin 12 so as to eliminate any wobble or clearance and assure minimum misalignment and angularity of the shaft axis and axis of the pin thread.

Support shaft 51 is quite long and is adapted slidably to receive the inner races of axially spaced apart ball bearings 55, 56, the outer races of which have been pressed into sockets 57, 58 at the ends of cylindrical body 59. Since the bearings are axially slidably mounted on the supporting shaft and since the shaft is cylindrical the bearings are inherently also rotatable on the shaft, but this is not essential though desirable. A pipe 60 is telescoped over the reduced diameter end 61 of body 59 and welded thereto. Body 59 and pipe 60 together form a thin walled, light weight drive tube. At the free end of the pipe 60 is welded a flange 63 to which an annular face plate 64 is secured by screws 65.

The distance from the inner bearing 55 to outer bearing 56 exceeds 50% of the distance from the inner bearing to face plate 65 so that the free end of the drive tube will be substantially concentric with the tool joint pin 12 despite the sliding fit between the bearings and the support shaft 51. With surface 70 of the face plate 64 perpendicular to the axis of the drive tube, it will be parallel to face 18 of tool joint shoulder 17. Generally speaking, with surface 70 disposed at the same angle to the axis of the drive tube as face 18 makes with the axis of the tool joint pin, surface 70 will be correlative to surface 18.

Secured to surface 70 of the face plate is an annular disc 71 of abrasive material. A pressure sensitive adhesive on the abrasive disc is used to hold it in position on the face plate.

Socket 58 of cylindrical body 59 is externally threaded at 80 to receive the internal threads 81 at one end of an adapter 82. The other end of the adapter is provided with an externally or internally threaded drive shaft 83 adapted for connection to an electric motor (not shown) such as a portable electric drill.

Referring now to FIGURE 2 once more, the tool there shown is the same as that of FIGURE 1, and bears like reference numbers, except that instead of disc 52 and ring 54 there is secured to flange 51a by means of screws 53 a disc 92 to which is welded an extension tube 93 on the end of which is welded a plug 94. Plug 94 is exteriorly taper threaded similar to tool joint pin 12 so that when it is made up tight in the box of tool joint 20 the support shaft 51 connected thereto is concentric with the thread of the tool joint box. This results in the surface 70 of face plate 64 being disposed perpendicular to the axis of the tool joint box and correlative to the face 24 at the mouth of the box.

It will be noted that pipe 60 makes the tool adapted to be slipped over the end of a tool joint pin as shown in FIGURE 1, the drive tube thus extending axially farther than the support shaft 51. Extension tube 93 makes it possible for the same tool to be used for a tool joint box as shown in FIGURE 2, the extension tube substantially equalizing the length of the drive tube with that of the support shaft plus extension tube, the latter being in fact slightly longer. In both cases however the face plate is disposed near the large diameter part of the tapered plug or ring connector.

With either a male or female tool joint the tool is used the same way. The drive tube is first removed from the support shaft. The part (connector) adapted to connect with the tool joint, ring 54 or plug 94 as the case may be is made up tight with the tool joint. A fresh disc of abrasive is placed on the face plate carried by the drive tube. The drive shaft of the electric drill is connected to drive shaft 83 of the adapter 82. The drive tube bearings are then slid over the end of the support shaft to position the abrasive disc adjacent the sealing face to be smoothed or resurfaced. The motor is started and the abrasive pushed against the sealing face. The metal on the sealing face may be merely lightly reconditioned as by removing burrs, or it may be completely resurfaced by removing up to one-sixteenth of an inch of metal as may be required in the case of deep grooves or excessive wear or corrosion. Removal of between .010 and .020 inch would be normal.

If the tool is to be used for a different size tool joint, a different size face plate and different size plug and ring connectors may be substituted for those shown, since these parts are removably connected to the tool by screws.

While a preferred embodiment of the invention has been shown and described, many modifications thereof can be made by one skilled in the art without departing from the spirit of the invention, and it is desired to protect by Letters Patent all forms of the invention falling within the scope of the following claim.

We claim:

A facing tool for tool joints comprising
a conically tapered coarse threaded connector adapted to engage a correlative tool joint,
a supporting shaft rigidly, non-rotatably secured to the connector coaxial therewith extending away from the connector a distance as great as the axial length of said connector,
a rigid drive tube,
inner and outer bearing means axially slidably mounted on said shaft and rotatably mounting said drive tube on said shaft,
said inner and outer bearing means being axially spaced apart a distance as great as the axial length of said connector with said inner bearing means closer to said connector than said outer bearing means,
said drive tube mounted on said inner and outer bearing means being coaxial with said supporting shaft and the inner periphery of said drive tube being spaced radially outwardly from the outer surface of said shaft,
an adapter means secured to the end of said drive tube nearest said outer bearing means and adapted for making connection with a drive motor,
said drive tube having a rigid portion at the other end thereof projecting axially beyond said inner bearing means and the end of the supporting shaft to which said connector is secured and to a point near the large diameter portion of said conically tapered coarse threaded connector,
said projecting portion having a larger inner diameter than the outer diameter of said connector,
an annular face plate adapted to carry an abrasive disc for refinishing a seal surface of the tool joint adjacent the large diameter portion of the conical taper thereof,
said face plate being secured to said projecting portion of the drive tube at the end thereof remote from said bearing means.

References Cited in the file of this patent

UNITED STATES PATENTS

| | | |
|---|---|---|
| 460,380 | McGarvey | Sept. 29, 1891 |
| 692,459 | Langlois | Feb. 4, 1902 |
| 1,334,224 | Campbell | Mar. 16, 1920 |
| 2,180,640 | Mikalson | Nov. 21, 1939 |
| 2,460,985 | Jackson | Feb. 8, 1944 |
| 2,491,565 | Johnson | Dec. 20, 1949 |
| 2,528,474 | Moore | Oct. 4, 1950 |
| 2,663,227 | Licciardello | Dec. 22, 1953 |
| 2,667,436 | Goepfert et al. | Jan. 26, 1954 |
| 2,802,319 | Hume | Aug. 13, 1957 |
| 2,878,626 | Elliott | Mar. 24, 1959 |